July 20, 1965 G. H. WILLIAMS 3,195,667
AIR-CUSHION BORNE VEHICLES

Filed Jan. 18, 1963 2 Sheets-Sheet 1

Inventor
Geoffrey Hugh Williams
Pennie, Edmonds, Morton, Taylor &
Attorneys

July 20, 1965　　　G. H. WILLIAMS　　　3,195,667
AIR-CUSHION BORNE VEHICLES
Filed Jan. 18, 1963　　　　　　　　　　2 Sheets-Sheet 2
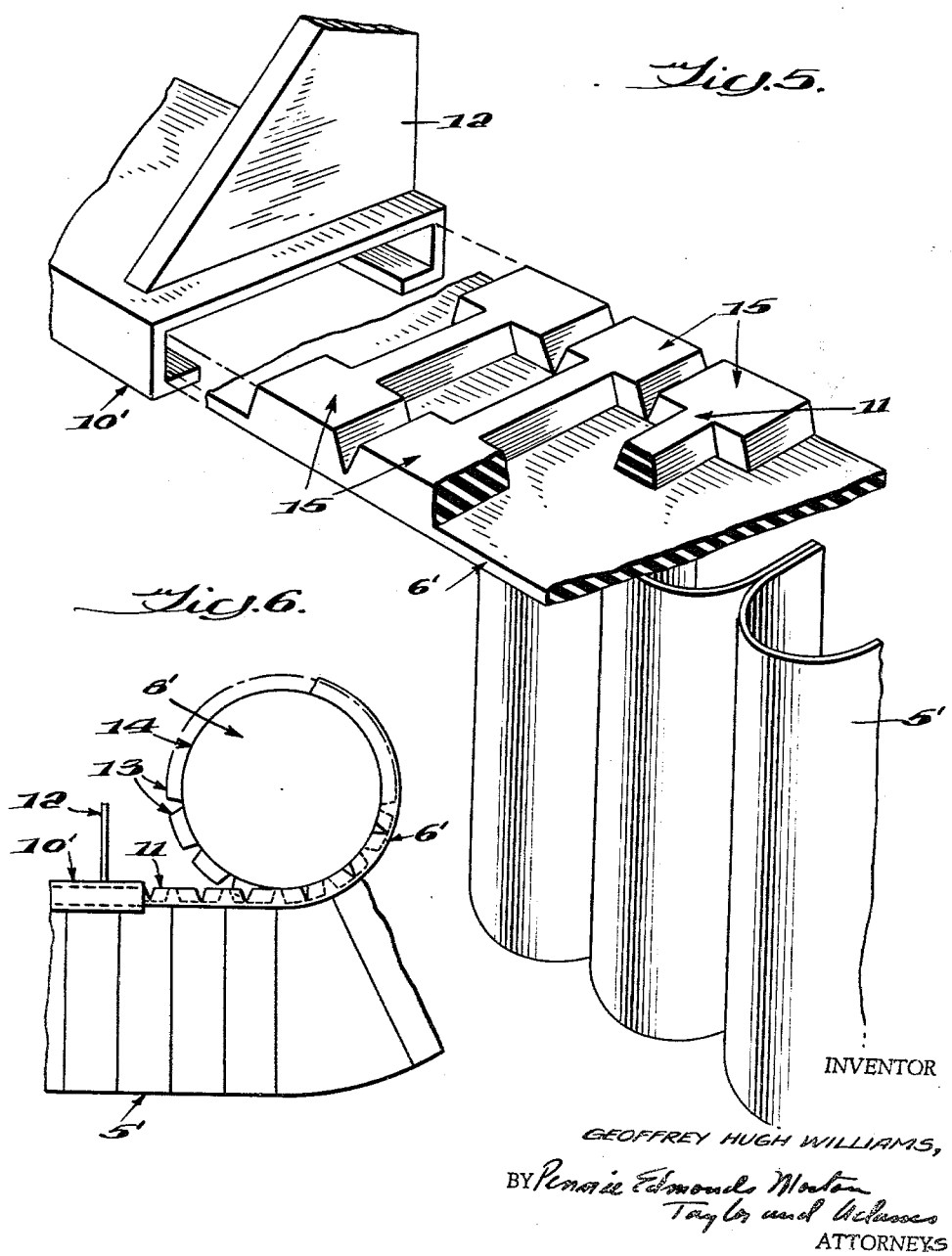
INVENTOR
GEOFFREY HUGH WILLIAMS,
BY Pennie Edmonds Morton
Taylor and Adams
ATTORNEYS

United States Patent Office 3,195,667
Patented July 20, 1965

3,195,667
AIR-CUSHION BORNE VEHICLES
Geoffrey Hugh Williams, Reading, England, assignor to Vickers-Armstrongs (Engineers) Limited, London, England, a British company
Filed Jan. 18, 1963, Ser. No. 252,451
Claims priority, application Great Britain, Jan. 22, 1962, 2,328/62
10 Claims. (Cl. 180—7)

This invention relates to vehicles that are adapted to ride on an air-cushion.

According to the present invention there is provided a vehicle that is adapted to ride on an air-cushion formed by forcing air through an opening in the underside of the vehicle body, there being, depending from the peripheral part of the underside of the body, a flexible skirt for encircling the cushion, the skirt having a front part, a rear part and two longitudinally extending side parts, wherein each side part is constituted by a portion of a band or the like the circumferential part of which forms a loop, the band or the like being mounted on the vehicle body for advancement of said circumferential part around the loop to permit said side parts to move relative to the vehicle body in a fore and aft direction.

For a better understanding of the invention and to show how the same may be carried into effect, reference will now be made by way of example, to the accompanying drawing in which:

FIGURE 5 is an enlarged broken perspective view of a belt and guide track structure therefor in which the belt is provided with gear teeth; and FIGURE 6 is a broken side detail of the construction shown in FIGURE 5 showing a toothed driving wheel for driving the belt shown in FIGURE 5.

Figure 1:
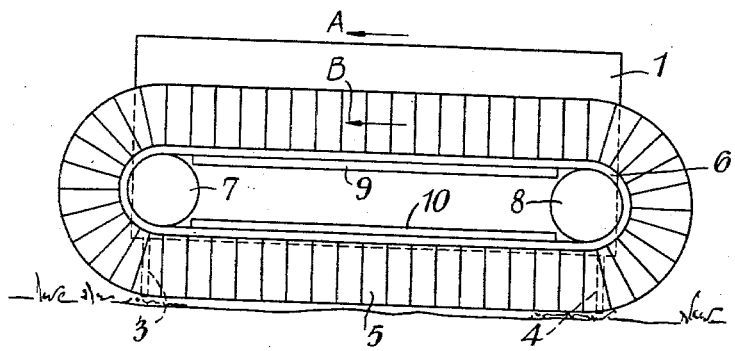
FIGURE 1 is a diagrammatic side elevation of an air-cushion borne vehicle.
Figure 2:
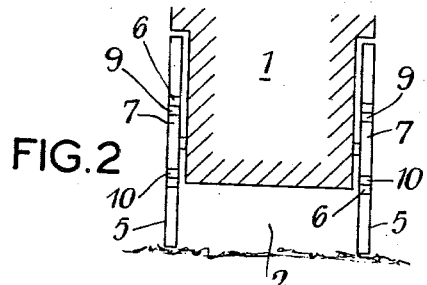
FIGURE 2 is a diagrammatic transverse sectional view of the vehicle of FIGURE 1.
Figure 3:
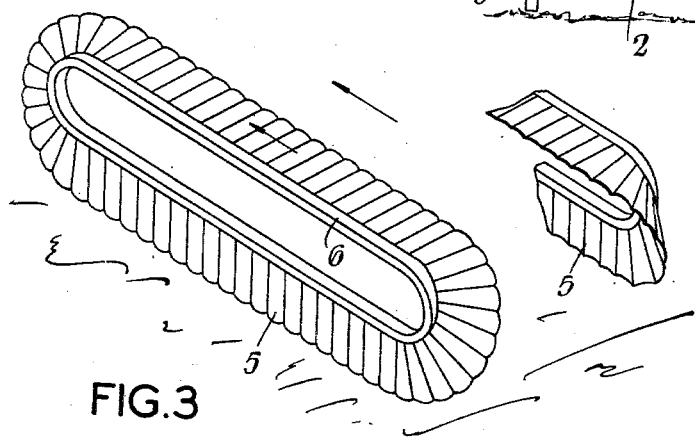
FIGURE 3 is a diagrammatic perspective view of parts of a modified form of the vehicle of FIGURES 1 and 2.

The vehicle of FIGURES 1 and 2 has a body 1 which is supported on an air cushion 2, the cushion being supplied with air through openings in a known manner (not shown) in the underside of the body 1 from a compressor of known type for this purpose (not shown) on the body 1. The cushion 2 is surrounded by a flexible skirt which depends from the underside of the body 1. The underside of the body 1 and the skirt form an air cushion space which is open to the ground at the bottom. The skirt consists of a front part 3, a rear part 4 and two longitudinal extending side parts 5. Each skirt part is flexible and may be constructed as described in any of commonly owned copending United States patent applications No. 210,451, filed July 17, 1962, No. 211,013, filed July 19, 1962 and No. 215,713, filed August 8, 1962. These applications describe skirts for air borne vehicles made of a series of adjacent discrete flexible members which may be triangular or trapezoidal in cross-section and which hang downwardly to enclose the air cushion. The members may be provided with flaps which overlap adjacent members or connected by a flexible sheet material which may be continuous. The members may be made of rubber or nylon or other suitable flexible materials. The front and rear skirt parts 3 and 4 and the side skirt parts 5 may be formed of strips of flexible material such as rubber having a constant thickness and folded to form a plurality of corrugations, or to produce a scalloped effect such as illustrated in FIG. 3. Furthermore, as shown in FIG. 3, the outer arcuate portions of the corrugations are preferably concave toward the air cushion 2 as more particularly described in copending application Ser. No. 215,713. Each side part 5 constitutes a portion of the length of a band formed as a closed loop of flattened form with top and bottom runs of the band extending substantially horizontally. The inner periphery of the band is secured to a chain or belt 6 which is passed around the wheels 7 and 8 and upper and lower guides 9 and 10. The whole of each band lies in a substantially vertical plane. The intended direction of motion of the vehicle is indicated by the arrow A and one of the wheels 7 and 8 associated with each band is arranged to be driven in a known manner by a motor (not shown) but located on the body 1 so that the band is advanced in the direction of the arrow B.

When the vehicle of FIGURES 1 and 2 is in operation moving in the direction of the arrow A the skirt parts 5 move rearwardly relative to the vehicle body 1 so that whenever the skirt parts 5 encounter ground, or an obstruction, drag on the vehicle is minimised.

If desired the wheels 7 and 8 may be mounted for free rotation and the driving motor omitted. In this case forces arising when the vehicle is moving in the direction of the arrow A the skirt parts 5 contact the ground causing the upper runs of the skirt bands to move in the direction of the arrow B.

Figure 4:
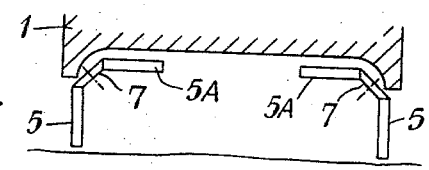
FIGURE 4 is a diagrammatic transverse sectional view of a vehicle incorporating the modification of FIGURE 3.

In the modification of FIGURES 3 and 4 the mounting of the bands that form the skirt parts 5 is such that the top run 5A of each band is maintained in a substantially horizontal plane, this being achieved by mounting the wheels 7 and 8 so that they are inclined at 45° to the vertical, as shown in FIG. 4.

Instead of mounting each band 5 on a chain or belt 6, it is possible to provide each band 5 with slides on its inner periphery, similar to or having the function of the belt or chain 6, these slides being engaged in a track in the form of a flat closed loop which is fixed to the vehicle body. This track has a guiding function similar to that of the wheels 7 and 8 and guides 9 and 10, and drive can be imparted to the band through the intermediary of an endless strip attached either to the inner or the outer periphery of the band. In the construction illustrated in FIGS. 5 and 6, the belt 6' is the form of a continuous loop, the outer surface of which carries the continuous flexible skirt band 5', attached to the belt in any suitable manner. The belt 6' on its other surface is provided with a series of teeth 11, preferably also somewhat flexible and which may be attached to or formed on the inner side of the belt 6'. The bottom run of the belt 6' engages inside a guide 10' in the form of a downwardly open inwardly lipped channel section. This guide 10' is attached to the vehicle body by brackets 12, as shown in FIGS. 5 and 6. The guide 9, shown in FIG. 1 for the top run of the belt 6' may be constructed like the guide 10' but opening upwardly. Each drive wheel 8' as illustrated by the showing in FIG. 6 is provided with teeth 13 which cooperate with the teeth 11 on the belt 6' to drive the latter and thus the skirt band 5' around the loop. A cylindrical portion 14 on either side of the teeth 13 is provided on each driving wheel 7 to cooperate with ends 15 of the teeth 11 provided on the belt to give additional support and insure registration of the belt and wheel.

Various alternative arrangements are possible; for example, free running rollers could be arranged at either end of the teeth 11 to run inside a modified guide rail to reduce friction. Alternatively, the teeth on the belt and driving wheels may be eliminated so that drive takes place by direct friction.

In another form (not shown) each of the two side parts of the skirt are formed by a driven belt the loop of which is closed by a seal constituted by a membrane of resilient flexible sheet material, such as rubber or synthetic rubber, the membrane being of folded conical form secured to the belt and basically defining a hollow cone, the wall of which has been folded back and forth along a number of fold lines parallel to its base to form a continuous skirt member with the bases of the cones secured to the surface of the belt, as disclosed in my copending application Ser. No. 237,218, filed November 13, 1962. Instead of making the membrane of folded conical form, the seals may consists of hollow cones having open hexagonal bases, which are open and secured to the driven belt.

If desired the front and rear parts 3 and 4 of the skirt may be replaced by the rotatable members described in commonly owned pending United States patent application Ser. No. 251,619, filed January 15, 1963, in which the skirt at each end is formed by a paddle wheel like structure extending teransversely of the vehicle and being rotatable on a horizontal axis. The radially-directed vanes of the rotatable member are made of flexible material such as rubber or synthetic rubber.

I claim:

1. An air-cushion borne vehicle comprisnig a vehicle body, a first flexible skirt part carried by the body below the front part thereof and extending transversely of the vehicle body, a second flexible skirt part carried by the vehicle body below the rear part thereof and extending transversely of the vehicle body, two skirt bands of flexible material carried one on each of the two longitudinal sides of the vehicle body and extending longitudinally thereof, each skirt band being in the form of a closed loop and including a projecting flexible skirt the lower run of which extends downwardly below the underside of the vehicle body, the two skirt bands and said first and second skirt parts together with the underside of the vehicle body forming and enclosing an air-cushion space containing an air cushion therein for supporting the air-cushion borne vehicle, and means mounting the skirt bands on the vehicle body for movement of each skirt band relative to the vehicle body and around its own closed loop.

2. A vehicle as claimed in claim 1, wherein each skirt band is of flattened form, the top and bottom runs of the band extending substantially horizontally.

3. A vehicle as claimed in claim 2, wherein each skirt band lies in a substantially vertical plane.

4. A vehicle as claimed in claim 2, wherein the part of each skirt band in the top run lies in a substantially horizontal plane and the part of each skirt band in the bottom run lies in a substantially vertical plane.

5. An air-cushion borne vehicle as claimed in claim 1, in which the mounting means for each skirt band includes a pair of spaced wheels and an endless support for the skirt band mounted on and trained around said wheels.

6. A vehicle as claimed in claim 5, in which said support comprises a belt to which the skirt band is secured.

7. A vehicle as claimed in claim 5, in which the mounting means includes guides for the support located between the speced wheels.

8. An air-cushion borne vehicle as claimed in claim 1, in which the mounting means for each skirt band includes an endless track carried on the vehicle body and slides attached to the inner periphery of the skirt band and engaged in said endless track for movement relative to the body of the vehicle.

9. A vehicle as claimed in claim 1, in which the mounting means for each skirt band cooperates with said skirt band to permit its free movement around its loop relative to the vehicle body.

10. An air-cushion borne vehicle as claimed in claim 1, wherein the bottom of said air-cushion space is open to the ground.

References Cited by the Examiner

UNITED STATES PATENTS

| 532,221 | 1/95 | Thomas | 114—67 |
| 3,077,174 | 2/63 | Cockerell | 114—67 |
| 3,095,938 | 7/63 | Bertelsen. | |

FOREIGN PATENTS

| 4,214 | 1/11 | Great Britain. |
| 350,108 | 6/31 | Great Britain. |

FERGUS S. MIDDLETON, *Primary Examiner.*

MILTON BUCHLER, *Examiner.*